B. WHELCHEL.
ARMATURE CASING.
APPLICATION FILED AUG. 6, 1909.
956,461.
Patented Apr. 26, 1910.
2 SHEETS—SHEET 1.
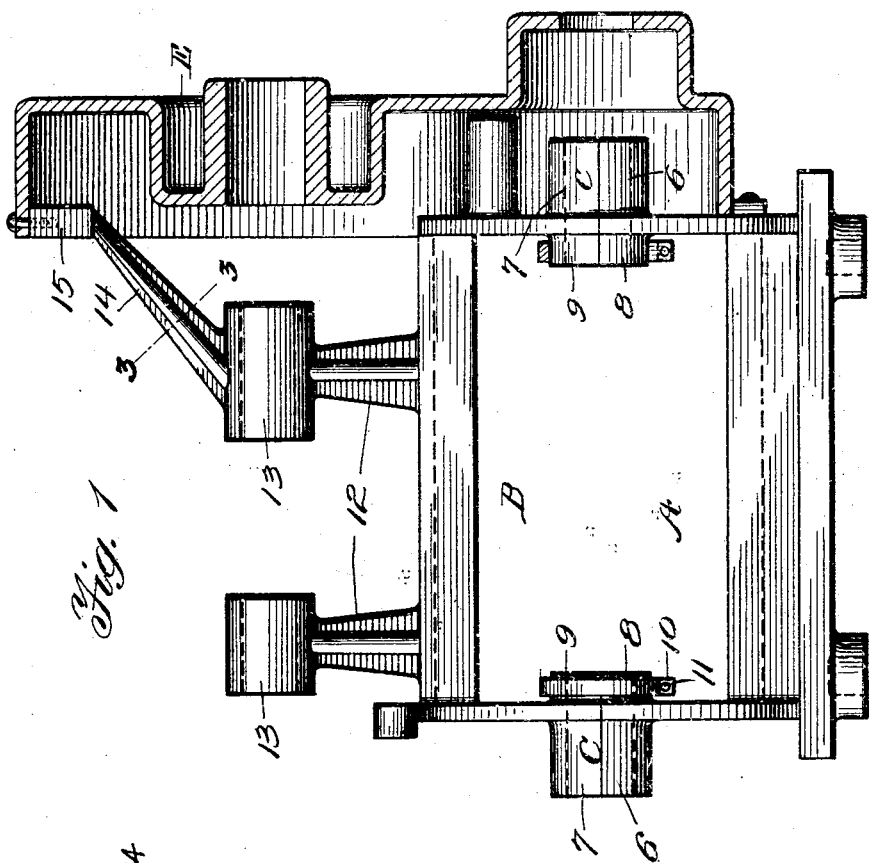
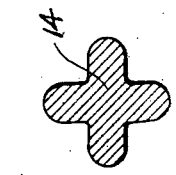
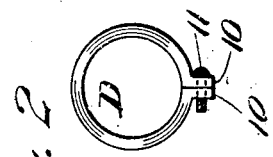
Witnesses
Inventor
Bert Whelchel
By Victor J. Evans
Attorney B. WHELCHEL.
ARMATURE CASING.
APPLICATION FILED AUG. 6, 1909.
956,461.
Patented Apr. 26, 1910.
2 SHEETS—SHEET 2.
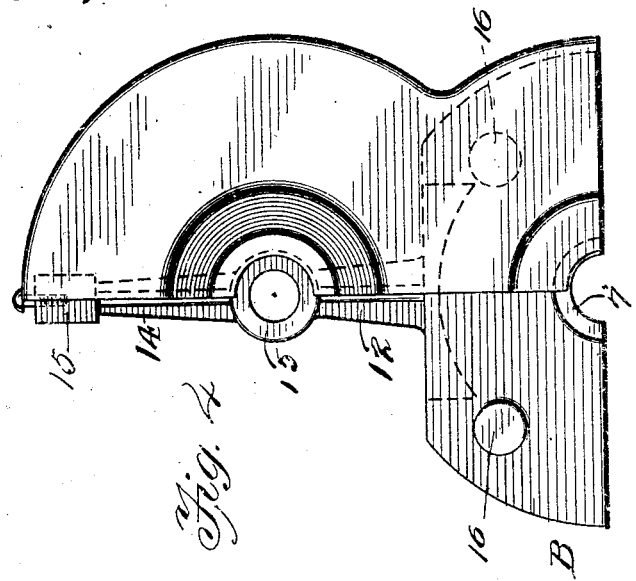
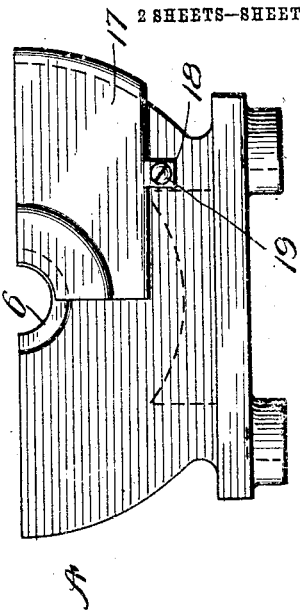
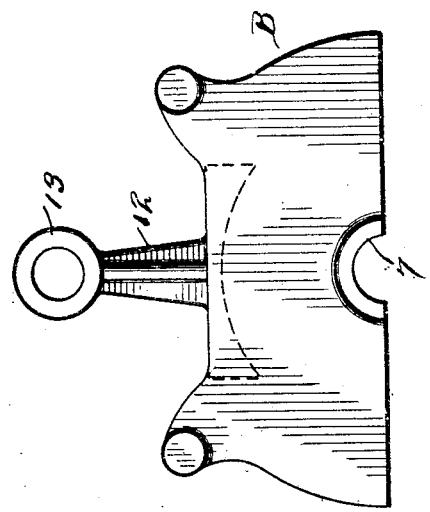
Witnesses
Inventor
Bert Whelchel
By Victor J. Evans
Attorney

UNITED STATES PATENT OFFICE.

BERT WHELCHEL, OF ANDERSON, INDIANA.

ARMATURE-CASING.

956,461.  Specification of Letters Patent.  Patented Apr. 26, 1910.

Application filed August 6, 1909. Serial No. 511,556.

*To all whom it may concern:*

Be it known that I, BERT WHELCHEL, a citizen of the United States, residing at Anderson, in the county of Madison and State of Indiana, have invented new and useful Improvements in Armature-Casings, of which the following is a specification.

This invention relates to casings for the armatures of dynamos, motors and the like; and the invention has for its objects to provide an armature casing of simple and efficient construction which may be readily assembled or taken apart without resorting to the use of skilled labor, and it shall possess superior advantages in point of simplicity, durability and general efficiency.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being however, understood that no limitation is necessarily made to the precise structural details therein exhibited, but that changes, alterations and modifications within the scope of the invention, may be resorted to when desired.

In the drawing: Figure 1 is a side view of the improved armature casing showing also the gear casing connected therewith. Fig. 2 is a detail view of the connecting clamp. Fig. 3 is a sectional detail taken on the line 3—3 in Fig. 1. Fig. 4 is an end view showing the parts of the armature casing separated and sligtly spaced apart, one-half of the gear casing having been removed. Fig. 5 is an end view taken from the opposite end of the upper half of the armature casing.

Corresponding parts in the several figures are denoted by like characters of reference.

The improved armature casing is composed of lower and upper halves or members designated respectively, A and B, said members, combining to form a casing which is essentially of the usual or conventional shape. The members A and B are provided at their ends and adjacent to their meeting edges with half boxes 6 and 7 combining to form bearings C; and the ends of the members A and B are provided upon their inner faces with flanges 8 and 9 adapted to be engaged by connecting clamps D each of which consists of a band of tough iron having terminal lugs 10 that are connected by means of a tightening screw 11. It will be readily seen that by loosening the screws 11, the clamps D may be readily detached, thus permitting the members A and B to be separated, and thus affording access to the interior of the casing.

The upper member B is provided with upwardly extending brackets 12 at the upper ends of which bearing boxes 13 are supported; one of the boxes 13 is provided with an upwardly extending inclined arm 14 having a terminal block 15 which affords a supporting means for the upper portion of the gear casing E, which is additionally supported by means of lugs 16 projecting from one end of the member B of the armature casing. The lower portion 17 of the gear casing has a lug 18 for the passage of a set screw 19 whereby it may be secured upon the end of the member A of the armature casing.

From the foregoing description it will be seen that the members A and B of the armature casing may be readily separated without reference to the gear casing by simply loosening the set screws 11 and detaching the clamps D. Reassembling of the armature casing may be effected in an equally simple and expeditious manner.

Having thus described the invention, what is claimed is—

1. An armature casing comprising a plurality of members, the end walls of which are provided with inwardly extending flanges, and a connecting clamp surrounding said flanges and having a tightening screw.

2. An armature casing comprising two members having half boxes constituting bearings, and flanges adjacent to the meeting edges of the end walls of the members, in combination with a connecting clamp surrounding the flanges and having a tightening screw.

3. An armature casing comprising two separably connected members having flanges adjacent to their meeting edges, and connecting clamps surrounding said flanges and provided with tightening screws; the upper member being provided with brackets having terminal bearing boxes, one of which supports an inclined arm having a terminal block, and one member of the armature casing being provided with outwardly extending lugs; in combination with a gear casing supported upon said lugs and upon the block of the inclined arm.

In testimony whereof I affix my signature in presence of two witnesses.

BERT WHELCHEL.

Witnesses:
D. C. CHIPMAN,
ALBERT S. McCALL.